United States Patent [19]

Ueno

[11] 4,125,407

[45] Nov. 14, 1978

[54] REFRACTORIES WHICH HAVE DENSE-STRUCTURE AS WELL AS SPALLING RESISTANCE AND METHOD FOR FABRICATING SAME

[75] Inventor: Haruyuki Ueno, Kitakyushu, Japan

[73] Assignee: Kurosaki Refractories Co., Ltd., Fukuoka, Japan

[21] Appl. No.: 767,258

[22] Filed: Feb. 10, 1977

[30] Foreign Application Priority Data

Feb. 17, 1976 [JP] Japan .................................. 51-16647

[51] Int. Cl.² ............................................ C04B 35/48
[52] U.S. Cl. ........................................ 106/57; 106/58;
106/59; 106/62; 106/65; 106/66; 106/69
[58] Field of Search ..................... 106/57, 58, 59, 62, 106/65, 66, 69

[56] References Cited

U.S. PATENT DOCUMENTS

| | | | |
|---|---|---|---|
| 3,025,175 | 3/1962 | Aldred | 106/57 |
| 3,175,919 | 3/1965 | Smoot et al. | 106/57 |
| 3,377,177 | 4/1968 | Fischer | 106/57 |

*Primary Examiner*—James Poer
*Attorney, Agent, or Firm*—Frank J. Jordan

[57] ABSTRACT

This invention relates to dense structure refractories having heterogeneous structure and resistance to spalling whose heterogeneous structure is composed of major high density areas of (1) coarse and intermediate grains of secondary particulate and minor low density areas of (2) fine grains and fine powders of secondary particulate distributed in a zigzag random way at the boundaries between the coarse and intermediate grains, which are fabricated from an overall batch mixture consisting of more than 60% by weight of particles of secondary particulate larger than 0.5 mm and less than 40% by weight of particles of secondary particulate smaller than 0.5 mm in size.

8 Claims, No Drawings

REFRACTORIES WHICH HAVE DENSE-STRUCTURE AS WELL AS SPALLING RESISTANCE AND METHOD FOR FABRICATING SAME

BACKGROUND OF THE INVENTION

This invention relates to a process for the production of refractories, more particularly to a process for producing refractories which have highly dense structures as well as high resistance to thermal spalling, in which, by producing a difference in the physical properties between groups of secondary particulate at the stage of granulation of primary particulate and by regulating particle size distribution of the overall batch mixture of said groups in a definite proportion at the stage of fabricating the batch mixture, heterogeneity of the structure of refractories can be obtained after conventional molding and sintering.

In refractories, although the density of the structure determines other properties such as the mechanical strength and the resistance to corrosion and errosion, those having a highly dense structure generally have a tendency to lack resistance to thermal spalling. Therefore, it has been an object of persons concerned in this line of industry to produce refractories which possess all of the above described desirable properties.

With the increasingly critical conditions encountered during the service of industrial furnaces, the need for improvement of the properties of refractories is keenly felt.

Broadly speaking, any refractory may be categorized as either an ordinary refractory or a highly dense structure refractory based upon the structure which is defined by the number and sizes of the grains and pores, the manner in which the pores are arranged in the material and the physical strength of the body.

Since ordinary refractories have an apparent porosity of about 10–20% by volume and the porosity of the matrix area is in the range of 30–40% by volume, and since the rate of penetration of slag and molten metal increases rapidly with increasing porosity, these corrosive agents react increasingly with the refractories at high temperatures, accelerating corrosion and erosion and resulting in structural spalling.

On the other hand, highly dense structure refractories which have an apparent porosity of less than 10% by volume and are fabricated by means of the fused casting method or the sintering method, wherein fine and/or ultrafine particles are used as the raw material, have a characteristic low porosity, high mechanical strength and excellent resistance to corrosion and erosion, but have low spalling resistance. This factor causes them to be unsuitable for service in locations where sudden temperature changes occur and the locations where this type of refractory is employable are also limited.

The phenomenon of thermal spalling is mainly attributed to a sudden temperature change in the refractories, which causes thermal stresses to develop. If these stresses exceed the shear or tensile strength of the refractories, cracks will develop throughout the structure and will bring about the collapse of the refractories. In order to prevent thermal spalling, the employment of a material with either a low expansion coefficient or a high thermal conductivity is advocated. These materials, however, are used for the purpose of precluding the development of thermal stress and not for arresting the development of the crack.

In spite of the fact that there is no difference in composition, as a rule, an ordinary refractory is superior to dense structure refractory when comparing resistance to thermal spalling during service.

From the above fact, it seems that when the intrinsic nature of resistance to thermal spalling is analyzed, there is an intimate connection thereof to the type of path along which a crack develops, either linearly or irregularly, since all refractories do develop cracks to some extent crack. than any connection thereof to the cause of the crack Generally, the crack in the dense structure refractory develops linearly and the fracture that occurs has sharp and smooth edges while the crack in the ordinary refractory develops in a zigzag or irregular manner and the edge of the fracture is ragged. The difference between the types of fractures which occur is due to the difference in the structure of the refractories. That is the ordinary refractory consists of an aggregate area which has high density and greater bonding strength and a matrix area which has a lower density and less bonding strength and a matrix area which has a low density and less bonding strength. Thus, the crack caused by thermal stress begins to develop and spread through the weaker matrix area, along the line of least resistance, which results in a zigzag or irregular fracture. In the case of a dense structure refractory which has an even structure and uniform bonding strength, a crack will develop in a straight line since no one area is weaker than another.

SUMMARY OF THE INVENTION

As a solution of the problems encountered in the refractory industry, the present invention has the objective of making possible the fabrication of excellent refractories as above described.

The present inventors accomplished previously an invention relating to a process for fabricating refractories having highly dense structures as well as high resistance to thermal spalling, wherein distributing possibly small areas of weak portions heterogenously in the structure of dense structure refractories consisting of particles of secondary particulate could be obtained by placing a limitation on the particle size distribution of the batch mixture of secondary particulate for thus green body.

SUMMARY OF THE INVENTION

Now the inventors have succeeded in achieving the same objective as an improvement of the above mentioned invention by adjusting the mean linear shrinkage coefficients of the secondary particulate in addition to the preceding adjustment on the particle size distribution of secondary particulates of the batch mixtures for green bodies.

Thus, it is an object of the invention to provide a process for fabricating dense structure refractories that have resistance to spalling from secondary particulates wherein different groups of secondary particulate having different mean linear shrinkage coefficients, the difference being within a limitation, are prepared at the stage of granulation of primary particulate; and the overall batch mixture of said different groups of secondary particulate whose particle size distribution is in a definite proportion is fabricated for the achievement of the preceding object.

It is another object of the invention to provide the dense structure refractories with characteristic heterogeneous structures which have never been seen in this field.

Although the process for fabricating dense structure refractories that have resistance to spalling from secondary particulates is provided in this specification, it goes without saying that this process according to the present invention can be carried out also for fabricating ceramics without departing from the spirit and scope of the present invention.

The present inventors have come to feel that in a dense structure refractory, if the weaker matrix area is minimized and distributed irregularly similarly to that of an ordinary refractory, thermal stress will cause irregular rather than linear cracks as in the ordinary refractory and the resistance to thermal spalling will be increased without giving up the advantages of a dense structure refractory. The structure of the modified dense structure refractory is dense and uneven and the crack due to thermal stress develops through the weaker area in the same way as in the ordinary refractory which makes it difficult for the refractory to peel and gives rise to resistance to spalling. Hence, the object of this invention is accomplished.

Accordingly, a most important aspect of this invention is the provision of a process by which there is formed a lower density area with weaker bonding strength which is distributed irregularly to a minimum extent throughout the dense structure refractories, and the subject matter of the present invention is in the adjustment of the difference of mean linear shrinkage coefficients of secondary particulate and particle size distribution of the overall batch mixture constituted therefrom.

BRIEF DESCRIPTION OF THE DRAWINGS

FIG. 1 is a schematic illustration of the structure of the refractories according to the present invention and FIG. 2 is that of conventional refractories.

DESCRIPTION OF THE PREFERRED EMBODIMENTS

The dense structure refractory, which is made by the sintering method, is usually made by grinding the raw material into a fine and/or ultra-fine powder in which the particle sizes range from 100μ to 74μ or below, preferably below 44μ, then grading the resulting particles, blending the various materials together, and, finally, molding and sintering the product causing it to shrink and to densify.

At this point, the problem of the molding method using the above fine and/or ultra-fine powder will be discussed. The particles of fine and/or ultra-fine powder have increased surface area and are accompanied by a large quantity of air which interferes with the molding process. To avoid this problem, size enlargement or granulation of these particles of ultra-fine powder by a suitable means such as a granulator, a spray dryer or a pelleting machine is generally employed.

Hereinafter, in this specification, agglomerates which are brought together to form larger particles from fine and/or ultra-fine particles are referred to generally as secondary particulates as compared to those fine and/or ultra-fine particles that are used as raw materials and are referred to as primary particulates.

Referring to the method of enlargement, various methods are employable for the fabrication of secondary particulates. Originally, bodies of primary particulates were brought together to form larger agglomerates by high pressure molding or compacting and the resultant agglomerates were crushed to suitable sizes to form the secondary particulates and then were screened to make a batch of the desired particle size composition. Recently, however, granulation which employs a spray driving technique is being used to form the secondary particulate.

In addition to these two methods, various conventional methods such as extruding, together with crushing and nodulizing, can be employed as circumstances warrant.

The thus prepared secondary particulates are classified and designated according to size as follows:

| classification of the secondary particulates | particle size |
| --- | --- |
| coarse grain | larger than 1 mm |
| intermediate grain | 0.5 – 1 mm |
| fine grain | 0.1 – 0.5 mm |
| fine powder | smaller than 0.1 mm |

The present inventors have found that by constituting different groups of batch mixtures having different mean linear shrinkage coefficients of secondary particulates within a limited range of difference and reconstituting overall batch mixtures whose particle size distribution had a definite composition, and following by conventional molding and sintering, an irregular distribution of a low density portion with weak strength will be produced to a minimum extent throughout the structure during sintering, whereby the development of cracks due to thermal stress can be controlled.

Therefore, the first subject matter of the present invention lies in the dense structure refractories having resistance to spalling which have heterogeneous structure consisting of a high density area of coarse and intermediate grains of secondary particulate and a low density area formed at the grain boundaries between the particles of secondary particulate to a minimum extent and which are fabricated by a process according to the present invention.

The second subject matter of the present invention lies in the process which comprises constituting at least two different groups of secondary particulate having different mean linear shrinkage coefficients of secondary particulate, provided that the difference of said coefficient is in a limited range, and reconstituting the overall batch mixture by mixing said different groups of secondary particulate in a definite particle size composition and following by conventional molding and sintering, whereby refractories having the above mentioned heterogeneous structure are produced.

It has been found and confirmed by the present inventors from molding and firing experiments, in which a mixture of materials of various particle size composition of secondary particulate were used, that a larger proportion of fine powder in the secondary particulate causes unfavorable results with regard to the spalling resistance of the fired refractories. It also has been found that the spalling resistance depends upon the amount of secondary particulate of particle size larger than 0.5 mm. Further, it has been found that the proportion of the secondary particulate of said particle size should be more than 60% by weight and the remaining portion may consist of fine powder and/or fine grain particles of less than 0.5 mm of secondary particulate accompanied with the unaboidably contaminating presence of a minute amount of primary particulate of less than 0.1 mm. The smaller the portion larger than 0.5 mm is, the more the resistance to spalling decreases and, if the portion larger that 0.5 mm is extremely small, it is impossible to produce such resistance. All proportions hereinafter are by weight unless otherwise indicated.

Next, with regard to the difference in the mean linear shrinkage coefficient, the present inventors have come to confirm the following fact. The structure of refractories which are fabricated from the batch mixture of secondary particulate can be characterized by defining the physical properties of the groups of secondary particulate which compose the overall batch mixture for the green body.

Thus, the difference in mean linear shrinkage coefficient between each particle of secondary particulate due to the difference of various physical properties will be brought about during the step of sintering which results in the formation of hair cracks at the boundaries of particles of secondary particulate from which the structure is constituted, and the degree of the formation of those hair cracks will depend on the difference in mean linear shrinkage coefficients of the groups of secondary particulate; which means that the size and degree of those cracks can be controlled by changing or combining the difference of mean linear shrinkage coefficients of the groups at the stage of fabricating the batch mixture for a molded green body. The present inventors further discovered that, if the difference in mean linear shrinkage coefficients between the groups of secondary particulate which compose the overall batch mixture for green body does exceed over 4%, the hair cracks formed at the boundaries of particles of secondary particulate will become significant and finally result in cracking of the structure and, if the difference of said coefficient can be maintained within the range of less than 4%, the heterogeneous structure produced by the formation of the less dense and weak portion produced at boundaries of particles of secondary particulate will endow refractories with the resistance to spalling after molding and sintering.

As to the methods for adjusting the difference in said coefficient of particles of at least two groups of secondary particulate within the range of 4%, the following various methods can be mentioned which also constitute the subject matter of the present invention. Constituting at least two different groups of secondary particulate having different linear shrinkage coefficients, with the difference which does not exceed over 4, can be performed as follows;

(1) by changing the kinds or amounts of mineralizers, for example, silica, titania, magnesia and similar substances to be added to the mixture of fine or ultra fine particles of primary particulate in the stage of granulation of primary particulate of various refractory materials, such as basic, acidic and neutral materials including alumina and other similar oxide materials (2) by changing the kinds or ratio of fine particles of primary particulate of the individual component material to be used in granulation in the case of combinations of materials, i.e. composite compounds, for example, magnesia-chromic oxide, magnesia-dolomite, alumino-silicate, alumino-zircon and spinel type refractories (3) by changing the particle size compositions of fine particles of primary particulate to be used in granulation (4) by changing the condition of heat treatment, for example, temperatures and heating periods, of fine particles of primary particulate which is to be used in granulation (5) by changing the condition of granulation or the method for granulation, for example, the kind or amount of binder and other similar conditions, such as temperature or concentration of materials, in the process of granulation such as spray drying (6) by coating the surface of particles of secondary particulate with various kinds or amounts of chemicals.

Various kinds or concentrations of coating agents such as soluble carbohydrate, gelatin, carboxymethylcellulose, methylcellulose, or polyvinylalcohol, can be applied on the surface of particles of secondary particulate, thereby producing heterogeneously weak portions to a minimum extent at the boundaries of the secondary particulate.

Alternatively, the above-mentioned coating can be performed after some degree of heating treatment of particles of secondary particulate and conventional sintering follows this coating, thereby producing weak portions as mentioned above.

Embodiments of the above-mentioned treatment will be described in detail.

FIRST EMBODIMENT

As the mineralizers, such materials as $TiO_2$, $SiO_2$, $Fe_2O_3$, ZnO, CuO, $CU_2O$, CaO, MgO, $B_2O_3$, Si and alloys containing silicon can be used singly or in combinations thereof and preferably in the amount of less than 10% of the particles of primary particulate to be used in the granulation. If the amount exceeds over 10%, mean linear shrinkage after sintering becomes so great that extraordinily low densification and too much heterogeneity occur in the structure of refractories, which makes it impossible to endow refractories with the spalling resistance and at the same time refractoriness. Slag and metal resistivity also decrease. The following table shows the examples in which improvement of the spalling resistance could be seen by adjusting the particle size distribution of secondary particulate as well linear shrinkage coefficient thereof. The difference in mean linear shrinkage coefficient is caused by changing the amount or kind of mineralizer during the granulation stage.

As the particle size composition of secondary particulate, more than 60% of the batch mixture of particles of secondary particulate is required to have the particle size greater than 0.5 mm as shown hereinabove, and the actual particle size distribution of the secondary particulate of the control group in Tables 1 (alumina) and 2 (magnesia) was as follows;

| 3~1mm | 70% |
|---|---|
| 1~0.5 mm | 10% |
| 0.5~0 mm | 20% |

(a) The particle size distribution of particles of primary particulate of alumina, from which particles of secondary particulate resulted, was as follows;

| 44 ~ 20μ | 15% |
|---|---|
| 20 ~ 5μ | 33% |
| 5 ~ 0μ | 52% |

(b) The particle size distribution of particles of primary particulate of magnesia, from which particles of secondary particulate resulted, was as follows;

| 44 ~ 20μ | 32% |
|---|---|
| 20 ~ 5μ | 46% |
| 5 ~ 0μ | 22% |

The mixing of particles of magnesia primary particulate with those of chromic oxide primary particulate, which have the abovementioned particle size distribution in the different ratios shown in Table 3 and granulating were performed, respectively, to produce two different groups of particles of secondary particulate, which have the different mean linear shrinkage coefficients, for example 10.3 and 11.2 respectively, as in lot No. 1.

Table 1:

Physical properties of the refractories fabricated from an overall batch mixture of different groups of secondary particulate, said overall batch mixture having a given range of particle size distribution and said different groups of secondary particulate having different mean linear shrinkage coefficients, which are produced by the change in kind or varying the amount of mineralizer

| kind of mineralizer | No. 1 | | No. 2 | | No. 3 | | No. 4 | | (alumina) No. 5* |
|---|---|---|---|---|---|---|---|---|---|
| | $SiO_2$ | $SiO_2$ | $TiO_2$ | $TiO_2$ | MgO | MgO | $SiO_2$ | $SiO_2$ | $TiO_2$ |
| amount of mineralizer (%) | +0.5 | +0.3 | +0.2 | +0.5 | +0.2 | +0.6 | 0 | +0.6 | +0.5 |
| mean linear shrinkage coefficient (%)** | 11 | 10 | 10 | 12 | 9 | 11 | 9 | 13.2 | 12 |
| particle size distribution of secondary particulate 3 ~ 1 mm | 35 | 35 | 30 | 40 | 40 | 30 | 35 | 35 | 70 |
| 1 ~ 0.5 mm | 5 | 5 | 5 | 5 | 8 | 2 | 5 | 5 | 10 |
| 0.5 ~ 0 mm | 10 | 10 | 5 | 15 | 9 | 11 | 10 | 10 | 20 |
| the difference of mean linear shrinkage coefficient (%) | 1 | | 2 | | 2 | | 4.2 | | 0 |
| apparent specific gravity | 3.77 | | 3.87 | | 3.78 | | 3.88 | | 3.74 |
| bulk specific gravity | 3.59 | | 3.69 | | 3.46 | | 3.52 | | 3.59 |
| apparent porosity (%) by vol. | 4.51 | | 6.0 | | 8.3 | | 9.2 | | 3.9 |
| panel spalling test number of times*** | 20 | | 20 | | 20 | | 20 | | 15 |
| appearance of sintered body | no spalling good | | no spalling good | | no spalling good | | no spalling craze | | spalling good |

*No. 5 is the control group consisting of only one batch mixture in which titania is used as a mineraliser.
**Mean linear shrinkage coefficient in this specification is such coefficient of secondary particulate when an amount of mineralizer such as given in the Table 1, is added during the stage of granulation of primary particulate (the amount of mineralizer is indicated by percent of increase to the gross amount of the mixture of particle primary particulate).
***The test condition: the test consists of repetetive of heating of one side of the specimen in a laboratory furnace at 1200° C for 15 minutes and subsequently cooling it in cold air by turns, using standard shaped bricks of 300 × 200 × 150 mm, which were fired at 1700° C for 10 hours after being pressed under the pressure of 900kg/cm.
The results are expressed as the number of times the specimen will stand this treatment without spalling.

Table 2:

Physical properties of the refractories fabricated from an overall batch mixture of different groups of secondary particulate, said overall batch mixture having a given range of particle size distribution and said different groups of secondary particulate having different mean linear shrinkage coefficients which are produced by the change in kind or varying the amount of mineralizer

| kind of mineralizer | No. 1 | | No. 2 | | No. 3 | | No. 4 | | (magnesia) No. 5* |
|---|---|---|---|---|---|---|---|---|---|
| | $TiO_2$ | $TiO_2$ | $TiO_2$ | $Al_2O_3$ | $SiO_2$ | $AL_2O_3$ | $TiO_2$ | $TiO_2$ | $TiO_2$ |
| amount of mineralizer (%) | +1 | +0.5 | +1 | +1 | +0.5 | +2 | +0.2 | +2 | +1 |
| mean linear shrinkage coefficient (%)** | 11 | 9 | 11 | 8 | 9 | 11 | 8 | 12.3 | 11 |
| particle size distribution of secondary particulate 3 ~ 1 mm | 35 | 35 | 30 | 40 | 40 | 30 | 35 | 35 | 70 |
| 1 ~ 0.5 mm | 5 | 5 | 5 | 5 | 8 | 2 | 5 | 5 | 10 |
| 0.5 ~ 0 mm | 10 | 10 | 5 | 15 | 9 | 11 | 10 | 10 | 20 |
| the difference of mean linear shrinkage coefficient (%) | 2 | | 3 | | 1 | | 4.3 | | 0 |
| apparent specific gravity | 3.44 | | 3.44 | | 3.43 | | 3.45 | | 3.4 |
| bulk specific gravity | 3.30 | | 3.25 | | 3.20 | | 3.40 | | 3.29 |
| apparent porosity (%) by vol. | 4.2 | | 5.6 | | 6.8 | | 1.5 | | 4.6 |
| panel spalling test number of times*** | 10 | | 13 | | 20 | | 20 | | 6 |
| appearance of sintered body | spalling good | | spalling passably good | | no spalling good | | spalling craze | | spalling good |

*No. 5 is same as shown in Table 1.
**The mean linear shrinkage coefficient is same as shown in Table 1.
***The spalling test condition is same as shown in Table 1 provided that sintering temperature is 1750° C.

SECOND EMBODIMENT

The particle size distribution of fine powder of magnesia primary particulate and that of chromic oxide primary particulate employed in this embodiment were as follows respectively;

| | magnesia | chromic oxide |
|---|---|---|
| 44~20 μ | 36% | 53% |
| 20 ~ 5 μ | 46% | 39% |
| 5 ~ 0 μ | 18% | 8% |

The two kinds of groups of secondary particulate thus prepared were respectively separated into several groups according to size by a screening procedure.

Then the overall batch mixture was reconstituted by mixing the above-mentioned several groups in the ratios as shown in Table 3, and the molding and the sintering followed.

As for the particle size distribution of secondary particulates, the secondary particulate larger than 0.5 mm should account for more than 60% of the overall batch mixture.

For example in lot No. 3, the secondary particulate larger than 0.5 mm accounts for 80% and the rest (20%) of the overall batch mixture is smaller than 0.5 mm.

No. 5 is the control lot in which only one group of secondary particulate is used for a batch mixture whose particle size distribution is as follows;

| | |
|---|---|
| 3 ~ 1 mm | 70% |
| 1 ~ 0.5 mm | 10% |
| 0.5 ~ 0 mm | 20% |

Thus, as shown in Table 3, dense as well as spalling resistant refractories can be fabricated as in No. 1 to No. 4 groups, in which more than two different groups having different mean linear shrinkage coefficients are fabricated separatedly and mixed to form the overall batch mixture having a definite particle size composition as shown in the Table, and followed by molding and sintering under conventional conditions. Conventional pressures applied in molding are from 300 to 1500 kg/cm$^2$ and conventional sintering temperatures ranging from 1600° C to 1800° C are used in this technique and conventional conditions for molding and sintering refer to these ranges of pressure and temperature throughout the present specification.

late after the granulation which has been carried out with respective materials.

Both can be operated with equal efficiency in this invention.

THIRD EMBODIMENT

The difference in mean linear shrinkage coefficients is caused by changing the particle size distribution of primary particulate.

Generally speaking, the finer the particles of primary particulate of materials, the greater the mean linear shrinkage coefficient of the secondary particulate. Thus, by exploiting these properties, and by changing the particle size distribution of particles of primary particulate, different groups of secondary particulate having different mean linear shrinkage coefficients can be obtained by changing the particle size distribution of particles of the primary particulate used in the stage of granulation for secondary particulate, whereby a heterogeneous weak portion, hairline crackled in extreme cases, can be produced at the boundaries of particles of secondary particulate after conventional molding and sintering.

(a) Alumina

Table 3:

Physical properties of the refractories fabricated from the overall batch mixture having a given particle size distribution, which was prepared by mixing different groups of secondary particulate which have different mean linear shrinkage coefficients, said different groups being prepared by changing the ratio or amount of the component material when fabricating composite material refractories.

| | No. 1 | | No. 2 | | No. 3 | | No. 4 | | No. 5* |
|---|---|---|---|---|---|---|---|---|---|
| magnesia powder (%) | 70 | 60 | 80 | 60 | 90 | 50 | 90 | 70 | 70 |
| chromic oxide powder (%) | 30 | 40 | 20 | 40 | 10 | 50 | 10 | 30 | 30 |
| mean linear shrinkage coefficient (%)** | 10.3 | 11.2 | 9.6 | 11.2 | 8.1 | 12.4 | 8.1 | 10.3 | 10.3 |
| particle size 3 ~ 1 mm | 35 | 35 | 30 | 40 | 40 | 30 | 20 | 50 | 70 |
| distribution 1 ~ 0.5 mm of | 5 | 5 | 5 | 5 | 8 | 2 | 5 | 5 | 10 |
| secondary particles 0.5 ~ 0mm | 10 | 10 | 5 | 15 | 9 | 11 | 5 | 15 | 20 |
| the difference of mean linear shrinkage coefficient (%) | | 0.9 | | 1.6 | | 4.3 | | 2.2 | 0 |
| apparent specific gravity | | 3.65 | | 3.69 | | 3.70 | | 3.68 | 3.66 |
| bulk specific gravity | | 3.39 | | 3.41 | | 3.36 | | 3.46 | 3.40 |
| apparent porosity (%) by vol. | | 8.2 | | 7.5 | | 9.1 | | 6.0 | 7.2 |
| panel spalling test number*** of times | | 6 | | 8 | | 10 | | 5 | 3 |
| appearance of sintered body | | spalling good | | spalling good | | spalling craze | | spalling good | spalling good |

*No. 5 is the control group.
**mean linear shrinkage coefficient in this table means that of secondary particulate fabricated by granulating a mixture of particles of primary particulate of component materials in the ratio given in the table.
***the spalling test condition is same as shown in Table 2.

In this embodiment, two different ways of fabrication of groups of secondary particulate with different mean linear shrinkage coefficients exists and both methods are included in this invention.

(1) The one is that the mixing of different kinds of materials (eg. magnesia and chromic oxide in this embodiment) in a desired proportion is made at the stage of primary particulate as shown in the preceding description.

(2) The outer is that the mixing of different kinds of materials is made at the stage of secondary particu- By changing the period of pulverization, of primary particulate, the particle size distribution in the group of primary particulates which is used in the granulation into secondary particulate can be controlled within the following range as shown in Table 4.

| |
|---|
| >44 |
| 44 ~ 20 μ |
| 20 ~ 5 μ |
| 5 ~ 0 μ |

Table 4:

The physical properties of refractories fabricated from an overall batch mixture of different groups of secondary particulate having different mean linear shrinkage coefficients, which were prepared by changing the particle size distributions of primary particulate of alumina to be used in granulation, said batch mixture having a given particle size composition.

| | No. 1 | | No. 2 | | No. 3 | | No. 4 | | No. 5* |
|---|---|---|---|---|---|---|---|---|---|
| >44 μ particle size | 13 | 0 | 20 | 1 | 0 | 0 | 30 | 10 | 0 |
| distribution 44 ~ 20 μ | 34 | 25 | 14 | 1 | 23 | 18 | 43 | 18 | 18 |
| of 20 ~ 5 μ | 17 | 32 | 26 | 31 | 18 | 3 | 15 | 3 | 3 |

Table 4:-continued

The physical properties of refractories fabricated from an overall batch mixture of different groups of secondary particulate having different mean linear shrinkage coefficients, which were prepared by changing the particle size distributions of primary particulate of alumina to be used in granulation, said batch mixture having a given particle size composition.

|  | No. 1 | | No. 2 | | No. 3 | | No. 4 | | No. 5* |
|---|---|---|---|---|---|---|---|---|---|
| primary particulate 5 ~ 0 μ | 36 | 43 | 40 | 63 | 59 | 79 | 15 | 79 | 79 |
| mean linear shrinkage coefficient (%)** | 7.3 | 9.4 | 6.8 | 10.1 | 11.2 | 12 | 5.9 | 12.1 | 12.1 |
| 3 ~ 1 mm | 35 | 35 | 30 | 40 | 30 | 40 | 20 | 50 | 70 |
| particle size distribution of 1 ~ 0.5 mm | 5 | 5 | 5 | 5 | 2 | 8 | 5 | 5 | 10 |
| secondary particulate 0.5 ~ 0 mm | 10 | 10 | 5 | 15 | 11 | 9 | 5 | 15 | 20 |
| the difference of mean linear shrinkage coefficient (%) | | 2.1 | | 3.3 | | 0.8 | | 6.1 | 0 |
| apparent specific gravity | | 3.92 | | 3.86 | | 3.77 | | 3.92 | 3.77 |
| bulk specific gravity | | 3.49 | | 3.50 | | 3.62 | | 3.48 | 3.63 |
| apparent porosity (%) by vol. | | 11.0 | | 9.3 | | 4.1 | | 11.2 | 3.1 |
| panel spalling test number of times*** | | 20 | | 20 | | 20 | | 20 | 13 |
| | | no spalling | | no spalling | | no spalling | | no spalling | spalling |
| appearance of sintered body | | good | | passably good | | good | | craze | good |

*No. 5 is the control group in which a group of batch mixture having one kind of particle size distribution is used for granulation of primary particulate. Maximum size of the particle in the group more than 44μ is possibly as great as 1 mm. As a mineralizer, 0.4% of titania is incorporated in the granulating mixture of fine particles of primary particulate.
**The mean linear shrinkage coefficient herein is that of particles of secondary particulate which are fabricated from particles of primary particulate having the particle size distribution mentioned on the same column.
***The condition for spalling test is same as mentioned in Table 1.

(b) Magnesia

Different groups of secondary particulate having different mean linear shrinkage coefficients were made by granulating different fine powders of primary particulate of magnesia having different particle size distribution which is obtained by changing pulverizing periods. The particle size distribution of primary particulate of magnesia thus obtained were as follows, as shown in Table 5.

|  |
|---|
| >44 |
| 44 ~ 20 μ |
| 20 ~ 5 μ |
| 5 ~ 0 μ |

Particle size in the group of more than 44μ can be as large as possible to the maximum size of 1 mm unless the granulating operation is prevented.

As a mineraliser, 1% of titania is incorporated in the granulating mixture of fine particles of primary particulate.

Table 5:

The physical properties of refractories fabricated from an overall batch mixture of different groups of secondary particulate having different mean linear shrinkage coefficients which were prepared by changing the particle size distributions of primary particulate of magnesia to be used in granulation, said batch mixture having a given particle size composition.

|  | No.1 | | No.2 | | No.3 | | No.4 | | No.5* |
|---|---|---|---|---|---|---|---|---|---|
| >44 μ | 14 | 0 | 14 | 3 | 0 | 0 | 13 | 0 | 0 |
| particle size distribution 44μ ~ 20 μ | 28 | 21 | 33 | 23 | 26 | 11 | 43 | 21 | 26 |
| of 20μ ~ 5μ | 36 | 48 | 42 | 49 | 38 | 47 | 19 | 32 | 38 |
| primary particulate 5μ ~ 0μ | 22 | 31 | 11 | 25 | 36 | 42 | 25 | 47 | 36 |
| mean linear shrinkage coefficient** | 7.8 | 10.3 | 6.6 | 8.3 | 11.2 | 12.3 | 7.1 | 12.6 | 11.2 |
| particle size 3 ~ 1 mm | 35 | 35 | 30 | 40 | 40 | 30 | 35 | 35 | 70 |
| distribution of 1 ~ 0.5 mm | 5 | 5 | 5 | 5 | 8 | 2 | 5 | 5 | 10 |
| secondary particulate 0.5 ~ 0 mm | 10 | 10 | 5 | 15 | 9 | 11 | 10 | 10 | 20 |
| the difference of mean linear shrinkage coefficient (%) | | 2.5 | | 1.7 | | 1.1 | | 5.5 | 0 |
| apparent specific gravity | | 3.49 | | 3.46 | | 3.48 | | 3.49 | 3.46 |
| bulk specific gravity | | 3.18 | | 3.10 | | 3.41 | | 3.20 | 3.32 |
| apparent porosity (%) by vol. | | 8.9 | | 10.3 | | 2.1 | | 8.3 | 4.1 |
| panel spalling test number of times*** | | 20 | | 20 | | 11 | | 20 | 6 |
| | | no spalling | | no spalling | | spalling | | no spalling | spalling |
| appearance of sintered body | | good | | good | | good | | craze | good |

*No. 5 is same as shown in Table 4.
**mean linear shrinkage coefficient is same as shown in Table 4.
***The condition for spalling test is same as mentioned in Table 2.

FOURTH EMBODIMENT

The difference in mean linear shrinkage coefficients of secondary particulate was caused by changing the conditions of heat treatment in the fabrication of particles of primary particulate to be used in the granulation.

Mainly in the case of synthetic material such as synthetic magnesia, different characteristics of particles, for example sintering ability, can be brought about by the change of the condition of heat treatment of primary particulate, even if the particles have the same size.

Thus the different groups of mixtures having different mean linear shrinkage coefficients of particles of secondary particulate can be formed by granulating different mixtures of different materials (for example B and C in Table 6) of primary particulate in different proportions as shown in the table, which have been subjected to different heat treatments.

In the following Table 6, the B material is fine powder of alumina fabricated by sintering at a temperature higher than 1800° C and the C material is that fabricated by sintering at lower than 1200° C.

The particle size distributions of particles of primary particulate of B material and C material are as follows.

|           | B    | C    |
|-----------|------|------|
| 44 ~ 20 μ | 16%  | 13%  |
| 20 ~ 5 μ  | 19%  | 12%  |
| 5 ~ 0 μ   | 76%  | 78%  |

| 44 ~ 20 μ | 16% |
| 20 ~ 5 μ  | 19% |
| 5 ~ 0 μ   | 75% | and varying the amounts of polyvinyl alchol used as a binder, different groups of particles of secondary particulate having different mean linear shrinkage coefficients were fabricated as shown in Table 7.

Subsequently, an overall batch mixture for molding having a given particle size distribution mentioned in the table, was blended with the addition of 0.5% silica by weight as a mineraliser, and followed by molding and sintering and the following result was obtained.

Table 7:

The physical properties of refractories fabricated from overall batch mixture having a given particle size distribution formed by blending different groups of secondary particulate which have different mean linear shrinkage coefficients obtained by varying methods of granulation

|  | No.1 | | No.2 | | No.3 |
|---|---|---|---|---|---|
| kind of binder | PVA | PVA | PVA | PVA | PVA |
| amount % | 2 | 1 | 0.5 | 2 | 2 |
| mean linear shrinkage coefficient (%) | 13 | 11 | 10 | 13 | 13 |
| particle size 3 ~ 1 mm | 35 | 35 | 35 | 35 | 35 |
| distribution of 1 ~ 0.5mm | 5 | 5 | 5 | 5 | 5 |
| secondary particulate 0.5 ~ 0mm | 10 | 10 | 10 | 10 | 10 |
| the difference of mean linear shrinkage coefficient (%) | | 2 | | 3 | 0 |
| apparent specific gravity | | 3.77 | | 3.81 | 3.78 |
| bulk specific gravity | | 3.52 | | 3.51 | 3.46 |
| apparent porosity (%) by vol. | | 6.6 | | 7.9 | 8.5 |
| panel spalling test number of times | | 20 no spalling | | 20 no spalling | 14 spalling |
| appearance of sintered body | | good | | passably good | good |

*PVA=polyvinyl alcohol
**Test for spalling resistance is same as shown in Table I.
***No.3 is control lot.

Table 6:

Physical properties of the refractories fabricated from an overall batch mixture of secondary particulate having a given range of particle size distribution, said overall batch mixture being composed of different groups of secondary particulate having different mean linear shrinkage of coefficients fabricated by combining different groups of fine powders of primary particulate which have been treated under different heating condition

|  | No.1 | | No.2 | | No.3 | | No.4 | | No.5* |
|---|---|---|---|---|---|---|---|---|---|
| material B (%) | 10 | 20 | 0 | 10 | 30 | 10 | 60 | 0 | 10 |
| material C (%) | 90 | 80 | 100 | 90 | 70 | 90 | 40 | 100 | 90 |
| mean linear shrinkage coefficient (%)** | 11 | 10.3 | 12.1 | 11 | 9.6 | 11 | 7.8 | 12.1 | 11 |
| particle size 3 ~ 1 mm | 35 | 35 | 30 | 40 | 30 | 40 | 50 | 20 | 70 |
| distribution 1 ~ 0.5 mm of | 5 | 5 | 5 | 5 | 2 | 8 | 5 | 5 | 10 |
| secondary particulate 0.5 ~ 0 mm | 10 | 10 | 5 | 15 | 11 | 9 | 15 | 5 | 20 |
| difference of mean linear shrinkage coefficient (%) | | 0.7 | | 1.1 | | 1.4 | | 4.3 | 0 |
| apparent specific gravity | | 3.80 | | 3.78 | | 3.82 | | 3.88 | 3.78 |
| bulk specific gravity | | 3.50 | | 3.54 | | 3.48 | | 3.47 | 3.53 |
| apparent porosity (%) by vol. | | 7.8 | | 6.3 | | 9.0 | | 10.6 | 6.7 |
| panel spalling test number of times*** | | 20 no spalling | | 20 no spalling | | 20 no spalling | | 20 no spalling | 14 spalling |
| appearance of sintered body | | good | | good | | good | | craze | good |

*No.5 is a control group in which only one group of batch mixture of secondary particulate is used for molding.
**The mean linear shrinkage coefficient in this table is that of secondary particulate obtained by granulating different mixtures of different material of primary particulate formed in different proportions said materials being treated under different heat condition.
***The condition for spalling test is same as mentioned in Table 1 (a).

FIFTH EMBODIMENT

Particles of secondary particulate having different means linear shrinkage coefficients can be made by changing the method of granulating primary particulates into secondary particulates.

For example, using particles of alumina primary particulate having the particle size distribution:

SIXTH EMBODIMENT

Different group of secondary particulate having different mean linear shrinkage coefficients can be produced by coating at least a portion of the surface of particles of said groups of secondary particulate with films of organic polymers, and blending the thus coated particles in a given particle size distribution to form a batch mixture for molding and molding and sintering conventionally.

ent densities at the boundary regions of particles in the structure of refractories produced therefrom.

Table 8:

The physical properties of refractories which were fabricated by using overall batch mixtures obtained which were blended by mixing different batch mixtures by coating with different concentrations of polymer, the surface of particles of secondary particulate

| | coating by spraying polyvinyl alcohol aqueous solution | | | coating by spraying polyvinyl butyral solution | | no spraying |
|---|---|---|---|---|---|---|
| % by weight of coating agent to the weight of secondary particulate | 0.5 | 0.77 | 0.032 | 0.5 | 0.03 | 0 |
| % of coating to the surface area of particles of secondary particulate | about 41.7 | about 5.8 | about 2.5 | about 41.7 | about 2.5 | 0 |
| apparent specific gravity | 3.94 | 3.86 | 3.84 | 3.93 | 3.83 | 3.77 |
| bulk specific gravity | 3.35 | 3.49 | 3.58 | 3.36 | 3.59 | 3.59 |
| apparent porosity (%) by vol. | 15.0 | 9.6 | 6.7 | 14.6 | 6.4 | 4.9 |
| panel spalling test number of times | 20 | 20 | 20 | 20 | 20 | 15 |
| appearance of sintered body | no spalling bad | no spalling passably good | no spalling good | no spalling bad | no spalling good | spalling good |

Thus, a latent weak portion is produced at the boundaries between particles and this portion will become hair crackle due to the burning of the thin layer of organic polymer in sintering, which results in an improvement of spalling resistance in refractories produced therefrom.

One method for coating particles of secondary particulate for example, is to spray a solution of organic polymer on to the particles while rotating these particles. The thickness of the film and the area coated can be controlled, by changing the speed of spraying, the concentration of the spraying solution, the speed of rotation of secondary particles or the period of spraying.

Referring to the ideal coating condition, the thinner the thickness of coating, the greater the spalling resistance. The area coated is preferably a third to two thirds of the entire surface area of particles of secondary particulate. As chemicals for coating, various kinds of chemicals including water soluble ones such as polyvinyl alcohol, CMC (carboxymethylcellulose) and dextrin, alcohol soluable ones such as PVB (polyvinyl butyral) and polyethylene glycol or oil soluable ones such as tar and pitch can be employed.

As an example, results of experiments will mentioned in Table 8 in which overall batch mixtures for molding were blended by mixing different groups of mixtures in which different concentrations of a water solution of polyvinyl alcohol or an alcohol solution of polyvinyl butyral are used for spraying, with conventional molding and sintering following this blending. The particle size distribution of particles of primary particulate of alumina is as follows:

| 44 ~ 20 μ | 15% |
|---|---|
| 20 ~ 5 μ | 33% |
| 5 ~ 0 μ | 52% | and that of secondary particulate is as follows:

| 3 ~ 1 mm | 60% |
|---|---|
| 1 ~ 0.5 mm | 20% |
| 0.5 ~ 0 mm | 20% | and 0.5% of silica is used as mineralizer in granulation.

By carrying out the method according to the various embodiments from the fisrt to the fifth, differences in mean linear shrinkage coefficients can be produced which result in the formation of portions having different densities at the boundary regions of particles in the structure of refractories produced therefrom.

These methods can be carried out singly or in combination with each other, for example, either by combining a process in which the kind of mineraliser is changed with another process in which the ratio of the amount of component compound is changed, or by combining further the process in which the granulation method is changed with the above two processes, the object of the present invention can thus be attained effectively.

By fixing the particle size distribution of secondary particulate in a definite range and by limiting the difference in mean linear shrinkage coefficients among respective groups of particles of secondary particulate to less than 4%, distortion appears at the boundaries between respective particles of secondary particulate and a low density weak portion is thus achieved, which becomes hair crackle in the extreme, and the heterogeneity of the structure thus produced gives refractories resistance to spalling as well as dense structure.

In spite of the fact that the mean distance between particles of primary particulate is almost equal to that between respective particles of secondary particulate and that the contact between respective particles of secondary particulate becomes very close, a minimum heterogeneity of the structure may be achieved due to the appropriate differences in mean linear shrinkage coefficients between particles of secondary particulate.

Although laminations frequently occurred in uniaxial pressing such as hydraulic pressing and friction pressing in the fabrication of dense structure refractories, It becomes possible to carry out, such as uniaxial pressing without producing lamination according to the present invention. Needless to say, isostatic pressing can be passively worked according to the present invention.

In the case of alimina refractories, for example, FIG. 1 is a schematic figure which shows the structure of the refractories that are obtained by molding followed by sintering an overall batch mixture which is fabricated by blending at least two different groups of batch mixtures having different linear shrinkage coefficients with the difference less than 4% and whose particle size distribution consists of more than 60% by weight of particles of secondary particulate larger than 0.5 mm and less than 40% by weight of particles smaller than 0.5 mm in size, according to the above-mentioned technical concept of the present invention. In this figure, 1 refers to the coarse grain secondary particulate larger than 1 mm in size, 2 shows the intermediate grain secondary particulate in the range of 0.5–1 mm in size, 3 indicates particles of coarse grain secondary particulate which were united by fusion and 4 represents the boundaries which are distributed in a zigzag random way between said coarse and intermediate grains and formed from the fine grain and fine powder secondary particulate smaller than 0.5 mm in size, optionally coexisting with particles of primary particulate which are present inevitably or intentionally and which form a low density area and become hairline-cracked in the extreme. The heterogeneity of the structure increases the spalling resistance. Cracks caused by thermal stress develop in a zigzag random manner along this low density area which improves the spalling resistance.

This heterogeneity of the structure of refractories consisting of high density areas of coarse and intermediate grains of secondary particulates and boundary regions of low density interposed at randon between the coarse and intermediate grains, which will appear as hairline-cracked in the extreme, is the first instance of the invention.

The above described characterisitcs are observed not only in the alumina refractories which were referred to herein, but also in all refractories made of secondary particulate from basic substances such as magnesia, magnesia-chromic oxide, or magnesia-alumina, acidic substances such as alumina-silica, zircon, zirconia or silica and neutral substances such as alumina or chromic oxide fine and/or ultra-fine materials.

In all cases, refractories with excellent spalling resistance and structure similar to the illustration in FIG. 1 are obtained.

In order to show the superiority of the refractories obtained according to the present invention when compared to those obtained by conventional methods, a schematic diagram, FIG. 2, of the structure of conventional refractories is presented. In this diagram, 5 shows the matrix area and 6 is the aggregate. It is evident from comparing this diagram with FIG. 1 that the structure of dense structure refractories which are obtained according to the present invention consists of a very small area of low density and a large area of high density. On the contrary, conventional refractories contain a large matrix area of low density. Therefore, it can be concluded that dense structure refractories which are produced according to the present invention not only possess a desirably high dense structure but also an increased spalling resistance due to the structure consisting of a large area of highly dense structure and a small area of less dense structure.

Since the refractories according to the present invention have not only dense structure and spalling resistance but also abrasion resistance and corrosion resistance, i.e. slag and metal resistance, they can be applied in various fields, for example, tuyere and bosh of blast furnaces, bottoms of mixers (torpedo car) for desulfurization and slag lines in the manufacture of pig iron; and important positions of AOD (Argon Oxygen Decarburization), CLV (Creusot- Loire Uddeholm), Q-BOP (Quality Basic oxygen process) and Tap hole and damaged portions of converters in steel making; hot spots and roofs of electric furnace; zone lining of ladle refining; plates and upper and lower nozzles of various sliding nozzles, snorkels of DH (Dortmund Horder) and RH (Ruhrstahl Heraeus), well brick of ladle, immersion nozzle, lanth pipe for blowing, glass melting furnace, coke oven, cement kiln, non-ferrous metal furnace, glass furnace, furnace for grinding material, electronics material, and nuclear reactor.

I claim:

1. Dense refractories having a heterogeneous structure and resistance to spalling, said heterogenous structure comprising a major high density area of coarse and intermediate grains of secondary particulate and minor low density areas of fine grains and fine powders of secondary particulate distributed in a zigzag random way at the boundaries between said coarse and intermediate grains, said secondary particulates comprising agglomerates of primary refractory material, said primary refractory material from which said agglomerate of secondary particles are formed being raw refractory material of fine and/or ultra-fine particles having a particle size of under 74$\mu$, said agglomerates of secondary particulates being separated into at least two groups of particles containing different size ranges in which each group has a different mean linear shrinkage coefficient, the difference in mean linear shrinkage coefficient between said two groups being less than 4%, said two groups being combined into a batch mixture comprising more than 60% by weight of particles of agglomerates of secondary particulates larger than 0.5 mm and less than 40% by weight of particles of agglomerates of secondary particulate smaller than 0.5 mm in size, said mixture being molded and sintered into said dense refractory.

2. A process for fabricating dense structure refractories with resistance to spalling from secondary particulates of at least one refractory material selected from the group consisting of magnesia, magnesia-chromic oxide, magnesia-alumina, alumina-silica, zircon, zirconia, silica, alumina and chromic oxide, which comprises granulating particles of primary particulate of less than 74$\mu$ of said refractory material into at least two different groups of secondary particulate having different mean linear shrinkage coefficients, the difference being less than 4%, separating by size each of the thus prepared secondary particulate groups into a number of groups of particles of different size range, reconstituting the particles into an overall batch mixture whose particle size composition is as follows:

| | |
|---|---|
| a coarse and an intermediate grain of secondary particulate with a particle size larger than 0.5 mm | more than 60% by weight |
| a fine grain and a fine powder of secondary particulate with a particle size less than 0.5 mm | the balance of the mixture and less than 40% by weight | molding said overall batch mixture under predetermined pressure between 300 and 1500 kg/cm$^2$ into a green body, and sintering at a temperature of 1600° C to 1800° C, thereby producing a heterogeneous structure consisting of major areas of high density coarse and intermediate grains of secondary particulate and minor areas of low density fine grains and fine powders of secondary particulate distributed in a zigzag random way at the boundaries between said coarse and intermediate grains.

3. A process according to claim 2 wherein at least two different groups of secondary particulate having different mean linear shrinkage coefficients, the difference being less than 4%, are fabricated by changing the kind or amount of mineralizer to be added to the primary particulate at the stage of granulation, the amount of said mineralizer being less than 10% of the particles of primary particulate.

4. A process according to claim 2 wherein at least two different groups of secondary particulate having different mean linear shrinkage coefficients, the difference being less than 4%, are fabricated by changing the ratio of the amounts of component compounds at the stage of granulation of said different groups when fabricating composite material refractories, said component compounds being those of composite compounds selected from the group consisting of magnesia-chromic oxide, magnesia-alumina and alumina-silica.

5. A process according to claim 2 wherein at least two different groups of secondary particulate having different mean linear shrinkage coefficients, the difference being less than 4%, are fabricated by changing the particle size distribution of particles of the primary particulate at the stage of granulation of said different groups.

6. A process according to claim 2 wherein at least two different groups of secondary particulate having different mean linear shrinkage coefficients, the difference being less than 4%, are fabricated by changing the condition of heat treatment of the primary particulate to be used in the granulation of primary particulate of said different groups.

7. A process according to claim 2 wherein at least two different groups of secondary particulate having different mean linear shrinkage coefficients, the difference being less than 4%, are fabricated by changing the method of granulation of primary particulate of said different groups.

8. A process for fabricating dense structure refractories having resistance to spalling from secondary particulates of at least one refractory material selected from the group consisting of magnesia, magnesia-chromic oxide, chromic oxide-magnesia, magnesia-alumina, alumina-silica, zircon, zirconia, silica, alumina and chromic oxide, which comprises:

grandulating particles of primary particulate of less than $74\mu$ of said refractory material into secondary particulate.

separating thus prepared particles of secondary particulate into at least two different groups, coating the surface of said particles at least partially with a different amount of kind of organic polymer coating agent in said different groups, separating thus coated particles according to size into a number of groups of particles of different size range in each of said different groups, reconstituting the particles into an overall batch mixture whose particles size composition is as follows:

| | |
|---|---|
| a coarse and an intermediate grain of secondary particulate with a particle size larger than 0.5 mm | more than 60% by weight |
| a fine grain and a fine powder of secondary particulate with a particle size less than 0.5 mm | the balance of the mixture and less than 40% by weight | molding said overall batch mixture under predetermined pressure between 300 and 1500 kg/cm² into a green body, and sintering at a conventional temperature of 1600° to 1800° C, thereby producing a heterogeneous structure consisting of major areas of high density coarse and intermediate grains of secondary particulate and minor areas of low density fine grains and fine powders of secondary particulate distributed in a zigzag random way at the boundaries between said coarse and intermediate grains.

* * * * *

UNITED STATES PATENT AND TRADEMARK OFFICE
CERTIFICATE OF CORRECTION

PATENT NO. : 4,125,407
DATED : November 14, 1978
INVENTOR(S) : Haruyuki UENO

It is certified that error appears in the above-identified patent and that said Letters Patent are hereby corrected as shown below:

On the page containing Columns 7 and 8, Table 2, in the line reading "apparent specific gravity", in the very last column thereof, change "3.4" to --3.45--.

Signed and Sealed this

Seventeenth Day of February 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,125,407
DATED : November 14, 1978
INVENTOR(S) : Haruyuki Ueno

It is certified that error appears in the above—identified patent and that said Letters Patent is hereby corrected as shown below:

On The Title Page, "8 Claims No Drawings" should read -- 8 Claims, 2 Drawing Figures --. Insert the attached sheet comprising Figs. 1 and 2, as part of Letters Patent.

UNITED STATES PATENT AND TRADEMARK OFFICE
CERTIFICATE OF CORRECTION

PATENT NO. : 4,125,407
DATED : November 14, 1978
INVENTOR(S) : Haruyuki Ueno

It is certified that error appears in the above—identified patent and that said Letters Patent is hereby corrected as shown below:

FIG.1

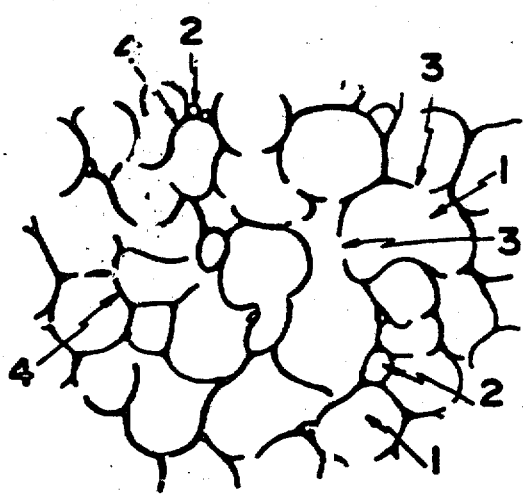

FIG.2

UNITED STATES PATENT AND TRADEMARK OFFICE
CERTIFICATE OF CORRECTION

PATENT NO. : 4,125,407

DATED : November 14, 1978

INVENTOR(S) : Haruyuki Ueno

It is certified that error appears in the above—identified patent and that said Letters Patent is hereby corrected as shown below:

Column 2, line 10, "crack" should read -- , rather --;

lines 22 and 23, delete "and a matrix area which has a low density and less bonding strength"; between lines 30 and 31, delete "SUMMARY OF THE INVENTION".

Column 4, line 6, "driving" should read -- drying --; line 27, "had" should read -- has --; line 67, "unaboidably" should read -- unavoidably --. Column 5, line 49, "4" should read -- 4% --. Column 6, line 36, "extraordinily" should read -- extraordinarily --. Columns 7 and 8, Table 1, in the note below the table having three asterisks, in the first line of such note, "repetetive of" should read -- repetitive --; Columns 7 and 8, Table 2, in the line reading "apparent specific gravity" in the very last column thereof, "3.4" should read -- 3.45 --. Columns 13 and 14, Table 6, in the last note designated by three asterisks, after "Table 1", delete "(a)". Columns 15 and 16, Table 8,

UNITED STATES PATENT AND TRADEMARK OFFICE
CERTIFICATE OF CORRECTION

PATENT NO. : 4,125,407

DATED : November 14, 1978

INVENTOR(S) : Haruyuki Ueno

It is certified that error appears in the above—identified patent and that said Letters Patent is hereby corrected as shown below:

in the introductory heading, line 1 thereof, after "batch mixtures" delete "obtained"; same head of Table 8, line 2, after "batch mixtures" insert -- obtained --; same heading of Table 8, line 3, delete "with different concentrations of polymer,"; same heading of Table 8, line 4, after "of secondary particulare" insert -- with different concentrations of polymer --; In Table 8, first line, third column of numerals, "0.032" should read -- 0.03 --. Column 16, line 48, "It" should read -- it --; line 53, "alimina" should read -- alumina --. Column 17, line 16, "randon" should read -- random --; lines 8 and 18, "hairlire-crackled" should read -- hairline-crackles --.

This certificate supersedes the Certificate of Correction issued February 17, 1981.

Signed and Sealed this

Twenty-sixth Day of May 1981

[SEAL]

Attest:

RENE D. TEGTMEYER

Attesting Officer

Acting Commissioner of Patents and Trademarks